United States Patent
Ogawa et al.

(10) Patent No.: US 8,450,016 B2
(45) Date of Patent: May 28, 2013

(54) FUEL CELL SYSTEM AND CONTROL METHOD OF FUEL CELL SYSTEM

(75) Inventors: Jumpei Ogawa, Saitama (JP); Chihiro Wake, Saitama (JP); Koichiro Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1258 days.

(21) Appl. No.: 11/491,715

(22) Filed: Jul. 24, 2006

(65) Prior Publication Data

US 2007/0026276 A1 Feb. 1, 2007

(30) Foreign Application Priority Data

Jul. 26, 2005 (JP) .................................. 2005-215291

(51) Int. Cl.
*H01M 8/04* (2006.01)
(52) U.S. Cl.
USPC ............ 429/414; 429/429; 429/431; 429/450
(58) Field of Classification Search
USPC ......................................... 429/12, 13, 22, 24
See application file for complete search history.

(56) References Cited

U.S. PATENT DOCUMENTS

| | | | | |
|---|---|---|---|---|
| 2003/0003334 A1* | 1/2003 | Yoshizawa et al. | ............. | 429/22 |
| 2004/0219401 A1* | 11/2004 | Hobmeyr et al. | ............... | 429/13 |
| 2005/0112418 A1* | 5/2005 | Roberts et al. | ................... | 429/13 |
| 2005/0214605 A1* | 9/2005 | Saitoh et al. | ..................... | 429/22 |
| 2006/0121322 A1* | 6/2006 | Haas et al. | ....................... | 429/13 |

FOREIGN PATENT DOCUMENTS

| | | |
|---|---|---|
| JP | 2002-208421 | 7/2002 |
| JP | 2002-305017 | 10/2002 |
| JP | 2002-313395 | 10/2002 |
| JP | 2003-203665 | 7/2003 |
| JP | 2003-297399 | 10/2003 |
| JP | 2004-22464 | 1/2004 |
| JP | 2004-111196 | 4/2004 |
| JP | 2005-85537 | 3/2005 |
| JP | 2005276547 A * | 10/2005 |
| JP | 2006-526271 | 11/2006 |
| WO | 2004/102708 A2 | 11/2004 |

OTHER PUBLICATIONS

Canadian Office Action for Application No. 2,552,705, dated Jun. 11, 2008.
Japanese Appeal Decision for Application No. 2011-26415, 21 pages, dated Oct. 2, 2012.
Japanese Office Action for Application No. 2011-26415, 4 pages, dated May 15, 2012.
Japanese Notice of Refusal for Application No. 2005-215291, dated Jun. 14, 2011.
Japanese Office Action for Application No. 2005-215291, dated Sep. 6, 2011.

* cited by examiner

*Primary Examiner* — Barbara Gilliam
*Assistant Examiner* — Stephan Essex
(74) *Attorney, Agent, or Firm* — Nelson Mullins Riley & Scarborough LLP; Anthony A. Laurentano

(57) ABSTRACT

A fuel cell system is provided which estimates a water content in a fuel cell based on a predetermined map using an integrated value of electric current generated by the fuel cell (ST4) before power generation is stopped (ST5). When a temperature of the fuel cell has fallen lower than a predetermined value (ST7) after the power generation is stopped (ST5), the fuel cell system determines a dry degree in the fuel cell (ST8) and an anode scavenging period (ST9) based on predetermined maps. Scavenging is performed in an anode in the fuel cell for the anode scavenging period (ST10).

8 Claims, 7 Drawing Sheets

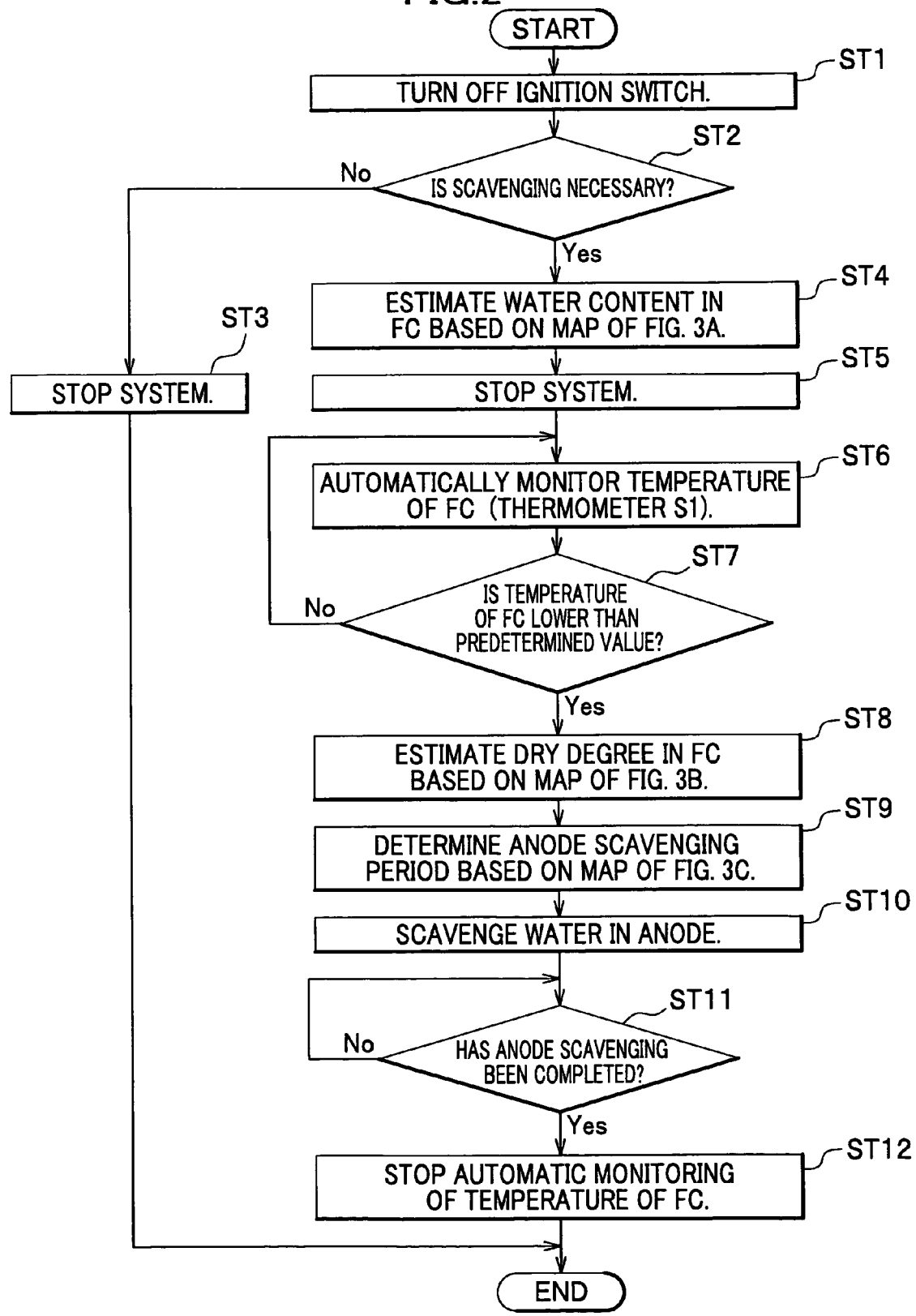

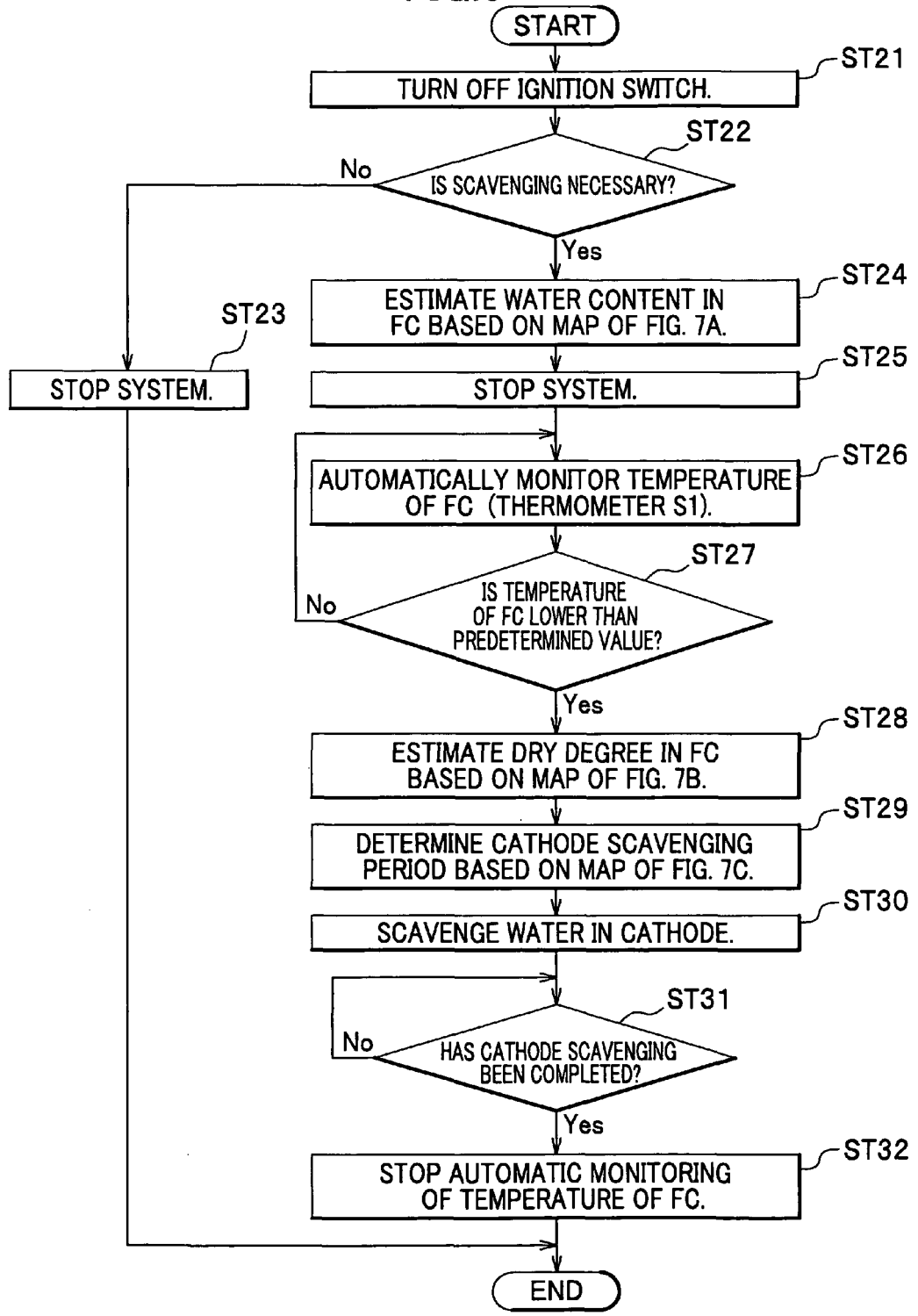

FUEL CELL SYSTEM AND CONTROL METHOD OF FUEL CELL SYSTEM

CROSS REFERENCE TO RELATED APPLICATIONS

This application claims the foreign priority benefit under Title 35, U.S. Code, §119 (a)-(d) of Japanese Patent Application No. 2005-215291, filed on Jul. 26, 2005 in the Japan Patent Office, the disclosure of which is herein incorporated by reference in its entirety.

BACKGROUND OF THE INVENTION

1. Field of the Invention

The present invention relates to a fuel cell system which can start operating in low temperature conditions and a control method of the fuel cell system.

2. Description of the Related Art

For instance, a PEM (Proton Exchange Membrane) fuel cell using a solid polymer as an electrolyte membrane is generally employed for a fuel cell stack in a fuel cell electric vehicle. This kind of fuel cell stack is a stack of plural cells each of which is formed by a membrane electrode assembly (MEA) sandwiched between a pair of separators. Moreover, the membrane electrode assembly is formed by an electrolyte membrane whose both sides are sandwiched between an anode electrode and a cathode electrode. Thus, hydrogen and air (oxygen) are respectively introduced to the anode and the cathode electrodes of the fuel cell. Then, electric power and water is generated by electrochemical reaction between the hydrogen and the oxygen.

The water is mainly generated in the cathode while the fuel cell is operating. However, the water generated in the cathode infiltrates to the anode through the electrolyte membrane provided between the cathode and the anode. Accordingly, the water remains in pipes inside and outside the fuel cell in the fuel cell system when the fuel cell stops generating power. As a result, in a case of using the fuel cell under low temperature conditions such as in cold climate regions or in winter, when the fuel cell stops generating power with the water left in the pipes, the water might be frozen so as to cause the electrolyte membrane and so on to be damaged. Therefore, scavenging gas is introduced to the anode and the cathode to scavenge the water when the fuel cell stops generating power (refer to JP 2003-203665A).

SUMMARY OF THE INVENTION

However, when power generation is stopped, a conventional fuel cell system scavenges the water for a pre-determined period. Therefore, there is a problem that unnecessarily too long scavenging causes the electrolyte membrane to deteriorate so as to lower performance of the power generation.

Moreover, since the fuel cell system scavenges after stopping power generation, the fuel cell system needs to derive power from a battery. Therefore, such unnecessarily too long scavenging wastes the power in the battery to excess, resulting in insufficient power for the next start, for instance, and ruin marketable quality.

To solve the above-mentioned conventional problems, an object of the present invention is to provide a fuel cell system and a control method of the fuel cell system which can scavenge with an appropriate amount of scavenging gas in accordance with situations.

In one aspect of the present invention, there is provided a fuel cell system having a fuel cell for generating power by reaction of reactive gases and a scavenging means for introducing scavenging gas to the fuel cell after the fuel cell stops generating the power. The fuel cell system includes a water content measuring means for measuring a water content in the fuel cell and a scavenging period determining means for determining a scavenging period based on the water content in the fuel cell measured by the water content measuring means.

According to the above setup, it is possible to determine the scavenging period in accordance with the water content measured by the water content measuring means so that an appropriate amount of scavenging gas is always used for scavenging. Here and below, "in the fuel cell" may indicate only inside of the fuel cell itself, or inside of the fuel cell as well as anode and cathode pipes connected to the fuel cell.

In the fuel cell system, the water content measuring means may include a power generation stop period measuring means for measuring a power generation stop period of the fuel cell and an after-stop water content estimating means for estimating the water content in the fuel cell after the fuel cell stops generating the power, based on the power generation stop period.

According to this embodiment, it is possible to estimate the water content based on how much time passes after the power generation is stopped. More specifically, it is possible to estimate that when the power generation stop period is longer, the fuel cell is drier and the water content is less, while when the power generation stop period is shorter, there is more of the water content.

In the fuel cell system, the after-stop water content estimating means may include a temperature detecting means for detecting a temperature of the fuel cell, and a water content compensating means for compensating the water content in the fuel cell after the fuel cell stops generating the power, based on the temperature of the fuel cell.

According to this embodiment, when the temperature of the fuel cell shifts to the higher side, the water content decreases more quickly with respect to the power generation stop period. On the other hand, when the temperature shifts to the lower side, the water content decreases more slowly with respect to the power generation stop period.

In the fuel cell system, the after-stop water content estimating means may include a humidity detecting means for detecting a humidity outside the fuel cell and a water content compensating means for compensating the water content in the fuel cell after the fuel cell stops generating the power, based on the humidity outside the fuel cell.

According to this embodiment, when the humidity of the fuel cell shifts to the higher side, the water content decreases more slowly with respect to the power generation stop period. On the other hand, when the humidity shifts to the lower side, the water content decreases more quickly with respect to the power generation stop period.

In the fuel cell system, the water content measuring means may include a before-stop water content estimating means for estimating the water content in the fuel cell while the power is generated.

According to this embodiment, it is possible to use an appropriate amount of scavenging gas to scavenge even when the power generation is stopped while warming-up immediately after the power generation is started.

In the fuel cell system, the before-stop water content estimating means may estimate the water content in the fuel cell based on an integrated value of electric current generated by the fuel cell.

According to this embodiment, it is possible to use the integrated value of the generated electric current to exactly estimate the water content.

In another aspect of the present invention, there is provided a fuel cell system control method for controlling a fuel cell system having a fuel cell which generates power by reaction of reactive gases and a scavenger which introduces scavenging gas to the fuel cell after the fuel cell stops generating the power. The fuel cell system control method includes steps of measuring a water content in the fuel cell and determining a scavenging period based on the acquired water content in the fuel cell.

According to the above method, it is possible to determine the scavenging period in accordance with the acquired water content so that an appropriate amount of scavenging gas is always used for scavenging.

The fuel cell system control method may further include steps of measuring a power generation stop period of the fuel cell and estimating the water content in the fuel cell based on the power generation stop period of the fuel cell.

According to this embodiment, it is possible to estimate the water content based on how much time passes after the power generation is stopped. More specifically, it is possible to estimate that when the power generation stop period is longer, the fuel cell is drier and the water content is less, while when the power generation stop period is shorter, there is more of the water content.

The fuel cell system control method may further include steps of detecting a temperature of the fuel cell and compensating the water content in the fuel cell after the fuel cell stops generating the power, based on the temperature of the fuel cell.

According to this embodiment, when the temperature of the fuel cell shifts to the higher side, the water content decreases more quickly with respect to the power generation stop period. On the other hand, when the temperature shifts to the lower side, the water content decreases more slowly with respect to the power generation stop period.

The fuel cell system control method may further include steps of detecting a humidity outside the fuel cell and compensating the water content in the fuel cell after the fuel cell stops generating the power, based on the humidity outside the fuel cell.

According to this embodiment, when the humidity of the fuel cell shifts to the higher side, the water content decreases more slowly with respect to the power generation stop period. On the other hand, when the humidity shifts to the lower side, the water content decreases more quickly with respect to the power generation stop period.

The fuel cell system control method may further include a step of estimating the water content in the fuel cell while the power is generated.

According to this embodiment, it is possible to use an appropriate amount of scavenging gas to scavenge even when the power generation is stopped while warming-up immediately after the power generation is started.

The fuel cell system control method may further include a step of estimating the water content in the fuel cell based on an integrated value of electric current generated by the fuel cell.

According to this embodiment, it is possible to use the integrated value of the generated electric current to exactly estimate the water content.

BRIEF DESCRIPTION OF THE DRAWINGS

FIG. 2 is a flow chart showing processes of scavenging after power generation is stopped in the first embodiment.

FIG. 6 is a flow chart showing processes of scavenging after power generation is stopped in the second embodiment.

DESCRIPTION OF THE PREFERRED EMBODIMENTS

Figure 1:
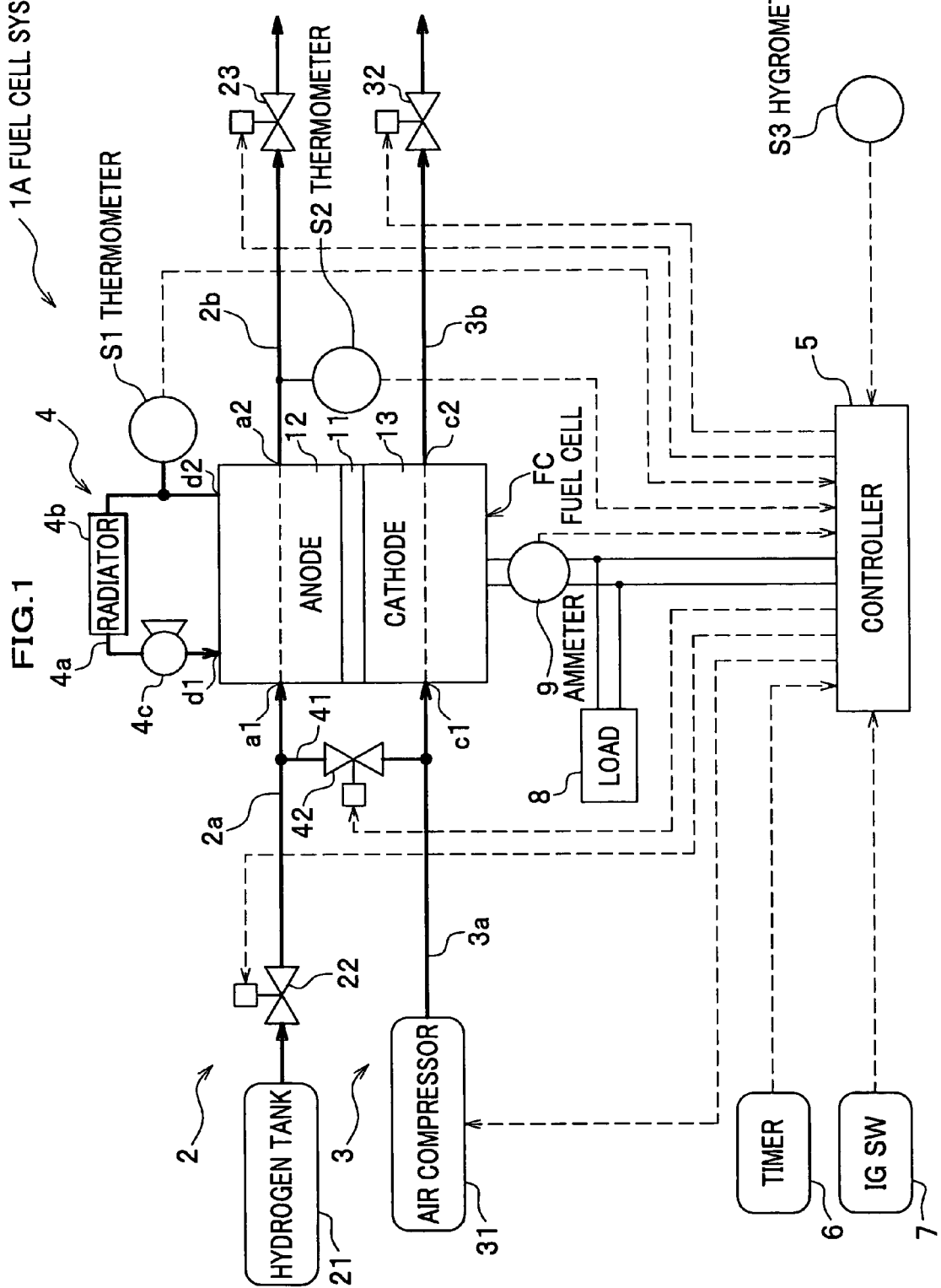
FIG. 1 is a configuration diagram showing a whole fuel cell system according to a first embodiment.

Here will be described embodiments of the present invention in detail, referring to the accompanying drawings as needed.

First Embodiment

The following description will be given to a case of a vehicle as an example. However, the present invention is not limited to this and may be also applied to a ship, an aircraft, and so on, as well as, to a stationary fuel cell system. Moreover, the following embodiment will be described in a case of being applied to anode scavenging.

A fuel cell system 1A of a first embodiment includes a fuel cell FC, an anode system 2, a cathode system 3, a cooling system 4, a controller 5, and so on.

A fuel cell with PEM (Proton Exchange Membrane), which is solid polymer, is employed as the fuel cell FC. An electrolyte membrane 11 is sandwiched between an anode 12 and a cathode 13 which include a predetermined catalyst, to form a membrane electrode assembly (MEA). The membrane electrode assembly is further sandwiched between a pair of electrically conductive separators (not shown) to form a cell. Then, a plurality of the cells are stacked to form a stack of the fuel cells FC.

The anode system 2 supplies and discharges hydrogen as reactive gas (fuel gas) to and from the anode 12 in the fuel cell FC. The anode system 2 includes an anode gas supply pipe 2a, an anode gas discharge pipe 2b, a hydrogen tank 21, a shutoff valve 22, a hydrogen purge valve 23, and so on.

An end of the anode gas supply pipe 2a is connected to an inlet side a1 of the anode 12 in the fuel cell FC while an end of the anode gas discharge pipe 2b is connected to an outlet side a2 of the anode 12 in the fuel cell FC. The hydrogen tank 21 can contain highly pure hydrogen with high pressure such as 35 MPa (350 atmospheric pressures), for instance. The hydrogen tank 21 is connected to the other end of the anode gas supply pipe 2a. The shutoff valve 22 is provided downstream of the hydrogen tank 21 or inside the hydrogen tank 21. The hydrogen purge valve 23 is provided in the anode gas discharge pipe 2b.

In the anode system 2, a regulator (not shown) to control pressure of the high pressured hydrogen released from the hydrogen tank 21 and an anode circulation system (not shown) to circulate unreacted hydrogen, which is discharged from the outlet side a2 of the anode 12 in the fuel cell FC, back to the inlet side a1 of the anode 12 in the fuel cell FC are provided downstream of the shutoff valve 22. The anode circulation system includes an ejector and an anode gas circulation pipe, for instance. Providing such an anode circulation system improves efficiency of using hydrogen as fuel.

The cathode system 3 supplies and discharges air as reactive gas (oxidizing gas) to and from the cathode 13 in the fuel cell FC. The cathode system 3 includes a cathode gas supply pipe 3a, a cathode gas discharge pipe 3b, an air compressor 31, an air back pressure valve 32, and so on.

An end of the cathode gas supply pipe 3a is connected to the inlet side c1 of the cathode 13 in the fuel cell FC. An end of the cathode gas discharge pipe 3b is connected to the outlet side c2 of the cathode 13 in the fuel cell FC. The air compressor 31, which is a motor driven supercharger or the like, is connected to the other end of the cathode gas supply pipe 3a. The air back pressure valve 32, whose opening degree can be controlled, is provided in the cathode gas discharge pipe 3b.

The cathode system 3 includes a humidifier (not shown) so that the air can be humidified by the humidifier and then supplied to the fuel cell FC. Moreover, the anode system 2 also may include a humidifier to humidify the hydrogen.

The cooling system 4 releases heat which the fuel cell FC generates while generating power, into the atmosphere. The cooling system 4 includes a cooling medium circulation pipe 4a, a radiator 4b, a circulation pump 4c, a thermometer S1, and so on. An end of the cooling medium circulation pipe 4a is connected to an inlet side d1 while the other end is connected to an outlet side d2 in the fuel cell FC. Thus, the cooling medium is supplied from the inlet side d1 and discharged from the outlet side d2 through a cooling medium channel formed in a separator (not shown) in the fuel cell FC.

Moreover, the fuel cell system 1A of the present embodiment also includes an air intake pipe 41, an air intake valve 42, a thermometer (a temperature detector or a temperature detecting means) S2, a hygrometer (a humidity detector or a humidity detecting means) S3, a timer (a power generation stop period counter or a power generation stop period measuring means) 6, and an ignition switch (IG SW) 7.

The air intake pipe 41 connects the anode gas supply pipe 2a and the cathode gas supply pipe 3a with each other upstream of the fuel cell FC. The air intake valve 42 is a valve which opens and closes so as to open and shut off a channel of the air intake pipe 41. The thermometer S2 is provided in the anode gas discharge pipe 2b near the outlet side a2 of the fuel cell FC. The hygrometer S3 detects humidity outside the fuel cell FC (for instance, in the atmosphere). The timer 6 measures a period (a power generation stop period) of how much time passes after the fuel cell FC stops generating power. The ignition switch (IG SW) 7 stops and starts the system. A scavenger (a scavenging means) in the present embodiment includes the air compressor 31, the air intake pipe 41, and the air intake valve 42.

The controller 5 includes a CPU (Central Processing Unit), a memory, an input-output interface, and so on. The controller 5 is electrically connected with the shutoff valve 22, the hydrogen purge valve 23, the air compressor 31, the air back pressure valve 32, the air intake valve 42, the thermometers S1 and S2, the hygrometer S3, the timer 6, and the ignition switch 7. Thus, the controller 5 controls operations to open and close the shutoff valve 22, the hydrogen purge valve 23, and the air intake valve 42, a rotation power of the motor in the air compressor 31, and an opening degree of the air back pressure valve 32. Moreover, the power generation stop period measured by the timer 6, an on or off signal from the ignition switch (IG SW) 7, the temperatures detected by the thermometers S1 and S2, and the humidity detected by the hygrometer S3 are input to the controller 5.

Furthermore, the controller 5 is electrically connected to the fuel cell FC so as to control an amount of the generated electric current to be acquired from the fuel cell FC. The acquired electric current is supplied to the air compressor 31 and a load 8 such as a motor for driving the vehicle. The fuel cell system 1A in the present embodiment also includes an ammeter 9 (an electric current detector) to monitor a value of the generated electric current acquired from the fuel cell FC. The value of the electric current detected by the ammeter 9 is sent to the controller 5. In the controller 5, an integrated value of the generated electric current is calculated based on the detected value of the electric current. Otherwise, a calculated integrated value of the generated electric current may be sent to the controller 5.

Next, scavenging processes in the fuel cell system in the present embodiment will be described referring to FIGS. 1-4.

When a driver turns on the ignition switch 7 of the vehicle, the controller 5 set a predetermined opening degree for the air back pressure valve 32 while keeping the air intake valve 42 and the hydrogen purge valve 23 being closed. Then, the controller 5 opens the shutoff valve 22 to supply hydrogen to the anode 12 in the fuel cell FC from the hydrogen tank 21. At the same time, the controller 5 starts the air compressor 31 to supply air humidified by a humidifier (not shown) to the cathode 13 in the fuel cell FC (See FIG. 1). Thus, in the fuel cell FC, power is generated by electrochemical reaction between the hydrogen, and oxygen in the air.

By the way, the hydrogen circulation system (not shown) to circulate hydrogen is provided in the anode system 2. Accordingly, when the power continues to be generated, impurities such as nitrogen in the air supplied to the cathode 13 may penetrate to the anode 12 through the electrolyte membrane 11 so as to lower a concentration of the hydrogen and thus performance of the power generation. Therefore, to prevent degradation of the performance of the power generation, the hydrogen purge valve 23 is periodically opened to introduce new hydrogen to the fuel cell FC so as to increase the concentration of the hydrogen.

As shown in FIG. 2, when a driver turns off the ignition switch 7 of the vehicle (ST1), the controller 5 determines whether scavenging is necessary in the fuel cell FC (ST2). Here, as criteria to determine whether the scavenging is necessary, freeze information of whether freezing would occur is acquired based on a temperature outside the vehicle, position data of the vehicle and meteorological data received by a navigation system in a case where the vehicle has the navigation system, or the like. Thus, when it is determined that the fuel cell system 1A is going to freeze after stopping the power generation, it is determined that the scavenging is necessary. When it is determined that the scavenging is unnecessary in ST2 (No), the controller 5 stops the system. In other words, the controller 5 closes the shutoff valve 22 to stop supplying the hydrogen to the fuel cell FC and stops driving the air compressor 31 to stop supplying the air to the fuel cell FC so as to stop the power generation of the fuel cell FC (ST3).

Figure 3A:
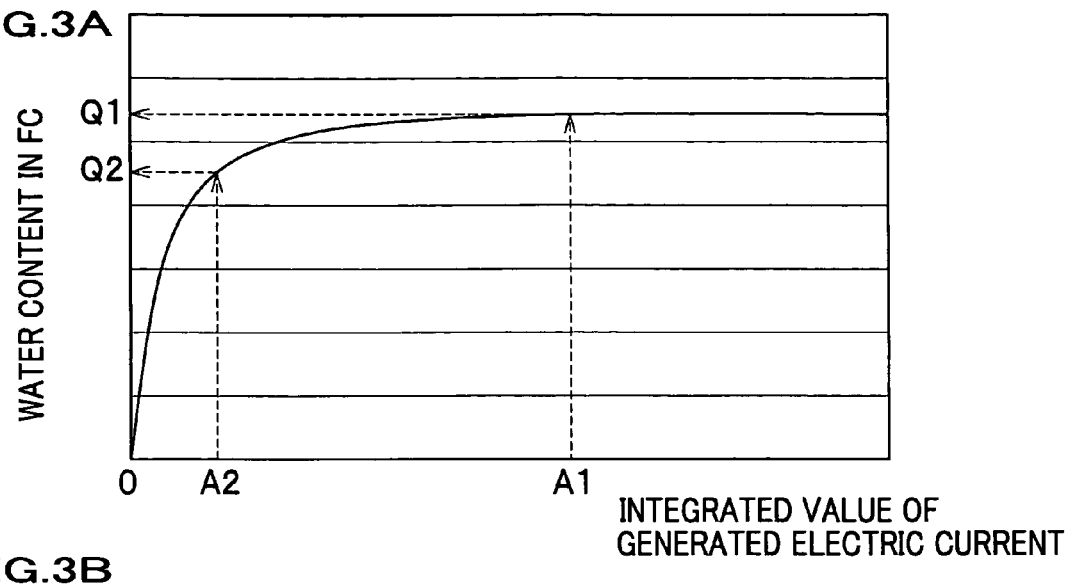
FIG. 3A is a map showing relationship between an integrated value of generated electric current and a water content in a fuel cell.

When it is determined that the scavenging is necessary in ST2 (Yes), the controller 5 calculates the integrated value of the generated electric current based on the current value of the ammeter 9 and estimates a water content in the fuel cell FC (referred to as "a water content in FC" hereafter) based on a predetermined map of FIG. 3A (ST4). As shown in FIG. 3A, after the ignition switch 7 is turned on, the water content in FC increases as the integrated value of the generated electric current increases, and then becomes constant (most humid). Here, the water content in FC means an amount of water not only in a stack itself of the fuel cell FC but also in pipes around the fuel cell, including the anode gas supply pipe 2*a*, the anode gas discharge pipe 2*b*, the cathode gas supply pipe 3*a*, and the cathode gas discharge pipe 3*b*.

Then, the controller 5 stops the system, that is, closes the shutoff valve 22 and stops driving the air compressor 31 so as to stop the power generation of the fuel cell FC (ST5). After having stopped the power generation, the controller 5 starts automatic monitoring of the temperature of the fuel cell FC (ST6) by the thermometer S1 and determines whether the temperature of the fuel cell FC has fallen lower than a predetermined value (ST7). Here, the predetermined value is preferably set to a temperature higher than the freezing point, such as 5° C., for instance. The water content in the fuel cell FC decreases (dries) gradually since the water is discharged through the air back pressure valve 32 and so on while the power generation is stopped.

When the temperature of the fuel cell FC has fallen lower than the predetermined value in ST7 (Yes), ST8 is processed. When the temperature of the fuel cell FC is higher than or equal to the predetermined value (No), automatic monitoring of the temperature in ST6 is continued. As described above, the anode scavenging is not performed immediately after the power generation is stopped. Thus, the controller 5 starts and performs processes in ST8 and the following steps when the temperature of fuel cell FC has become low enough. The reason is as follows. When the scavenging is performed immediately after the ignition switch 7 is turned off, more dews are still going to form since the fuel cell FC is on the way to get colder. Therefore, scavenging and drying at a breath after the dews have condensed to some extent can save energy necessary for the scavenging.

Figure 3B:
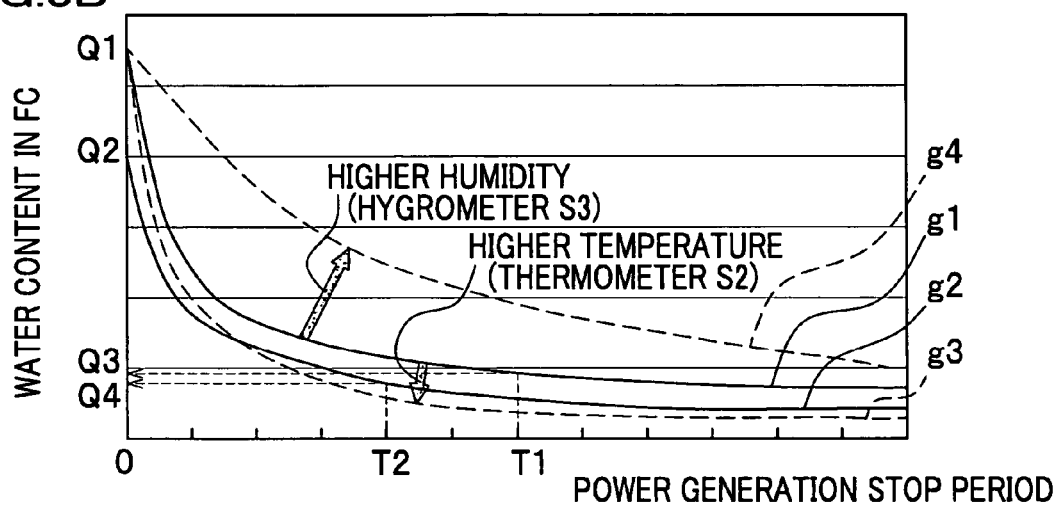
FIG. 3B is a map showing relationship between a power generation stop period and the water content in the fuel cell.

In ST8, a dry degree in the fuel cell FC is estimated based on a map of FIG. 3B. In a map of FIG. 3B, a solid line g1 shows change in the water content with respect to the power generation stop period when the water content in FC is Q1. A solid line g2 shows change in the water content with respect to the power generation stop period when the water content in FC is Q2, which is less than Q1. A dashed line g3 shows a compensation line when the temperature is higher than the line g1. A dashed line g4 shows a compensation line when the humidity is higher than the line g1.

As shown by a line g1 in FIG. 3B, the water content in FC decreases as the power generation stop period becomes longer. Here, the higher temperature the thermometer S2 detects, the more easily the water dries. Therefore, the water content in FC may be estimated based on the line g3. Moreover, the higher humidity the hygrometer S3 outside the fuel cell FC detects, the more hardly the water dries. Therefore, the water content in FC may be estimated based on the line g4.

Figure 3C:
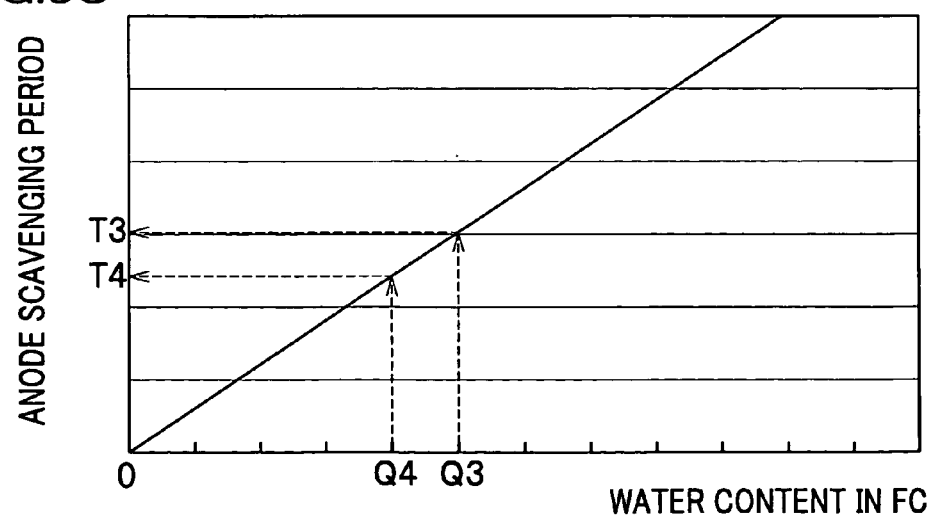
FIG. 3C is a map showing relationship between the water content in the fuel cell and an anode scavenging period.

In ST9, the anode scavenging period is determined based on a map of FIG. 3C. The horizontal axis of the map of FIG. 3C is the water content in FC estimated in ST8. As shown in FIG. 3C, the more water content in FC remains, the longer anode scavenging period is required. Meanwhile, the less water content in FC remains, the shorter anode scavenging period is required.

In ST10, the anode scavenging is performed for the anode scavenging period determined in ST9 as described above. More specifically, the controller 5 opens the air intake valve 42 and the hydrogen purge valve 23. In addition, the controller 5 adjusts an opening degree of the air back pressure valve 32 and drives the air compressor 31 in order to supply air as scavenging gas from the air compressor 31 to the anode 12 in the fuel cell FC. Here, the scavenging gas is supplied to the inlet side a1 of the anode 12 in the fuel cell FC through the cathode gas supply pipe 3*a*, the air intake pipe 41, and the anode gas supply pipe 2*a*. Then, the scavenging gas is discharged from the outlet side a2 of the anode 12 in the fuel cell FC, and sent to the anode gas discharge pipe 2*b*. Moreover, at this time, the gas including hydrogen is diluted to the predetermined hydrogen concentration by a diluter (not shown) and then discharged into the atmosphere.

In ST11, it is determined whether the anode scavenging has been completed. Here, to determine whether the anode scavenging has been completed, pressure sensors (not shown) are provided in the inlet side a1 and the outlet side a2 of the anode 12 in the fuel cell FC, for instance. Thus, it is possible to determine whether the scavenging has been completed by monitoring whether difference between pressures detected by the pressure sensors becomes less than a predetermined value. Or, a flow sensor may be provided instead of the pressure sensors, or merely a length of time may be counted to determine whether the scavenging has been completed. In ST11, when it is determined that the anode scavenging has not been completed (No), the process in ST11 is repeated. When it is determined that the anode scavenging has been completed (Yes), automatic monitoring of the temperature of the fuel cell FC is stopped (ST12).

The controller 5 may include a water content measuring means (ST4 and ST8), a scavenging period determining means (ST9), an after-stop water content estimating means (ST8), a water content compensating means (ST8), and a before-stop water content estimating means (ST4). The controller 5 may also include a power generation stop period measuring means, a temperature detecting means, and a humidity detecting means. Moreover, the controller 5 may perform a fuel cell system control method in the claims.

In addition, the scavenging of the fuel cell system 1A will be described in detail. For instance, as shown in an example 1 in FIG. 4, when the ignition switch (IG SW) 7 is turned on (at the time t0), the water content in FC starts increasing, and then humidity inside the fuel cell FC reaches a maximum (a constant value) after the power is generated for a while. The water content in FC generated by the power generation for the period (between the times t0 and t1) is estimated based on the integrated value of the generated electric current. For instance, assuming that the integrated value of the generated electric current is A1 as shown in FIG. 3A, the water content in FC at that time is estimated to be Q1 based on the map of FIG. 3A. Then, when the ignition switch 7 is turned off (at the time t1), the water content in FC starts decreasing (drying) gradually as time passes. After that, when the temperature in the fuel cell FC measured by the thermometer S1 becomes lower than the predetermined value, the anode scavenging is started (at the time t2). Assuming that the power generation stop period at this time point is T1, the water content in FC is Q3 as shown in the map of FIG. 3B. As a result, the anode scavenging period is determined to be T3 according to the map of FIG. 3C. The anode scavenging is performed for the anode scavenging period T3 determined in this way so as to cause dryness inside the fuel cell FC to reach a maximum (at the time t3).

As described above, when the power generation stop period is longer, the scavenging period can be shorter since the inside of the fuel cell FC is drier. Meanwhile, when the power generation stop period is shorter, the scavenging period should be longer since the inside of the fuel cell FC is less dry. Thus, it is always possible to set an appropriate period for the scavenging period.

Figure 4:
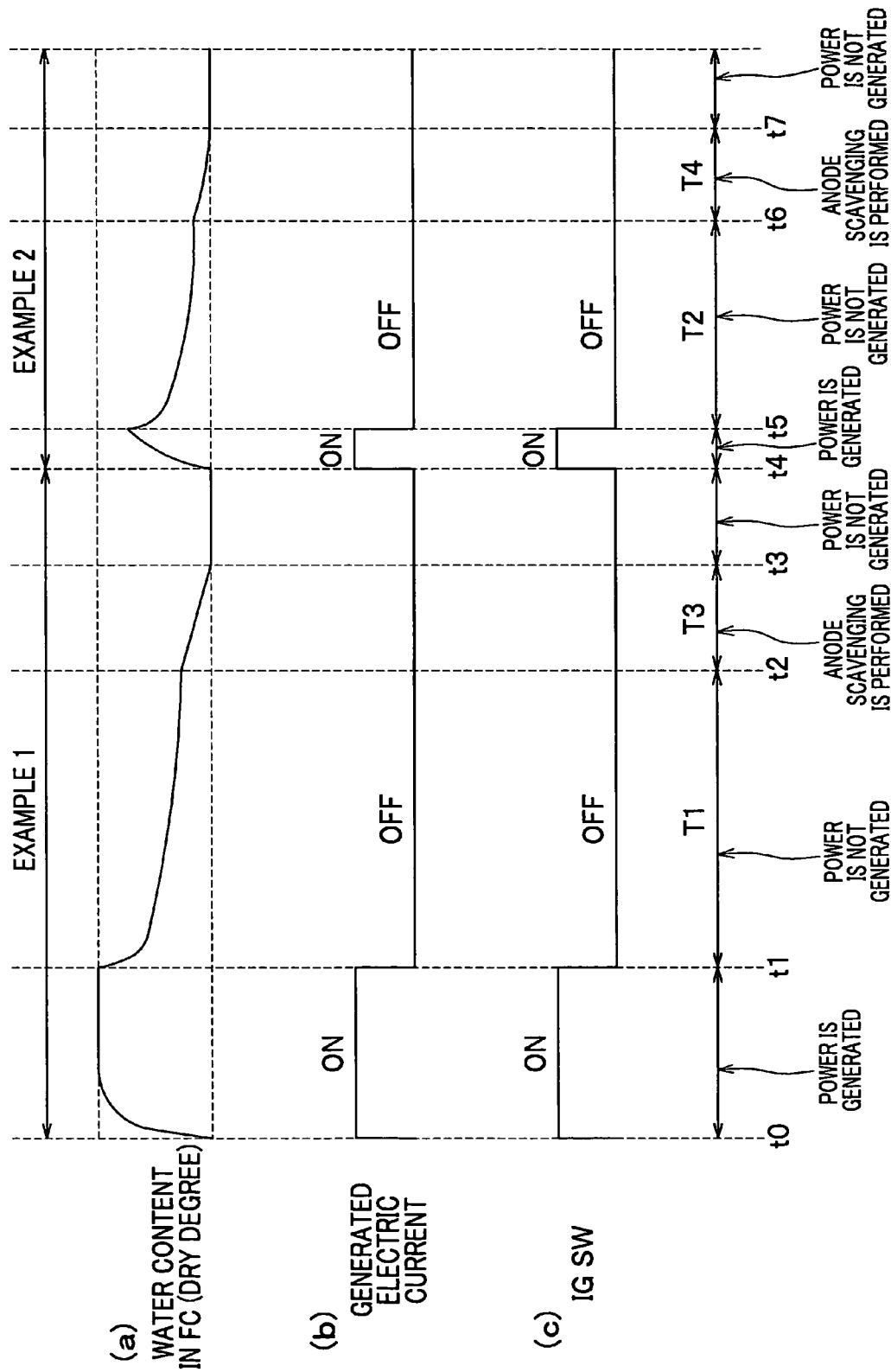
FIG. 4 is a time chart showing: (a) change in the water content in the fuel cell; (b) change in the generated electric current; and (c) timing to turn on and off an IG SW (ignition switch).

On the other hand, as shown in an example 2 in FIG. 4, when the ignition switch 7 is turned off (at the time t5) after driving the vehicle for a short period immediately after the ignition switch 7 is turned on (at the time t4), the water content in FC starts decreasing before the humidity inside the fuel cell FC reaches the maximum (the constant value). Therefore, when the water content in FC (dry degree) is estimated based on the line g1 in FIG. 3B, the water content is estimated to be more than an actual water content in FC since there is a gap between the initial values of the water contents in the examples 1 and 2. In such a case, it is possible to estimate the water content in FC based on the integrated value of the generated electric current using the map of FIG. 3A so as to eliminate the above-mentioned gap (an error margin). In this case, the dry degree in the fuel cell FC can be estimated based on another solid line g2 in FIG. 3B. For instance, in a case where the integrated value of the generated electric current is A2 (see FIG. 3A), which is smaller than A1 shown in the above-mentioned embodiment, the water content in FC at this time is Q2. Q2 is applied to the line g2 in FIG. 3B as the water content in FC at this time so as to estimate that the remaining water content in FC is Q4 in accordance with the power generation stop period. Then, Q4 is applied to the map of FIG. 3C as the estimated remaining water content in FC to determine that the anode scavenging period is T4 (between the times t6 and t7) corresponding to the estimated water content in FC (dry degree). The line g2 in the map of FIG. 3B in the example 2 may be compensated based on the values detected by the thermometer S2 and the hygrometer S3 so that the compensated map can be used, similarly to the example 1.

As described above, even when the ignition switch 7 is turned off before the humidity reaches the maximum (in a case of a short driving), the water content in FC is estimated with the integrated value of the generated electric current. Accordingly, it is possible to appropriately determine the scavenging period so as to prevent unnecessarily too long scavenging and save power consumption. Therefore, less power is consumed from an accumulator such as a battery and a capacitor so that enough power can be reserved to start the system for the next time and that the marketable quality of the fuel cell system 1A can be improved. Moreover, when the inside of the fuel cell FC has already become dry (driest), no more scavenging is performed to dry the inside of the fuel cell FC. As a result, it is also possible to prevent deterioration of especially the electrolyte membrane 11.

In the first embodiment, only the anode scavenging has been described. However, the air as scavenging gas may be supplied from the air compressor 31 to the cathode 13 in the fuel cell FC in order to perform the cathode scavenging before the anode scavenging, such as immediately after or at the same time when the system is stopped in ST5, for instance.

Second Embodiment

Figure 5:
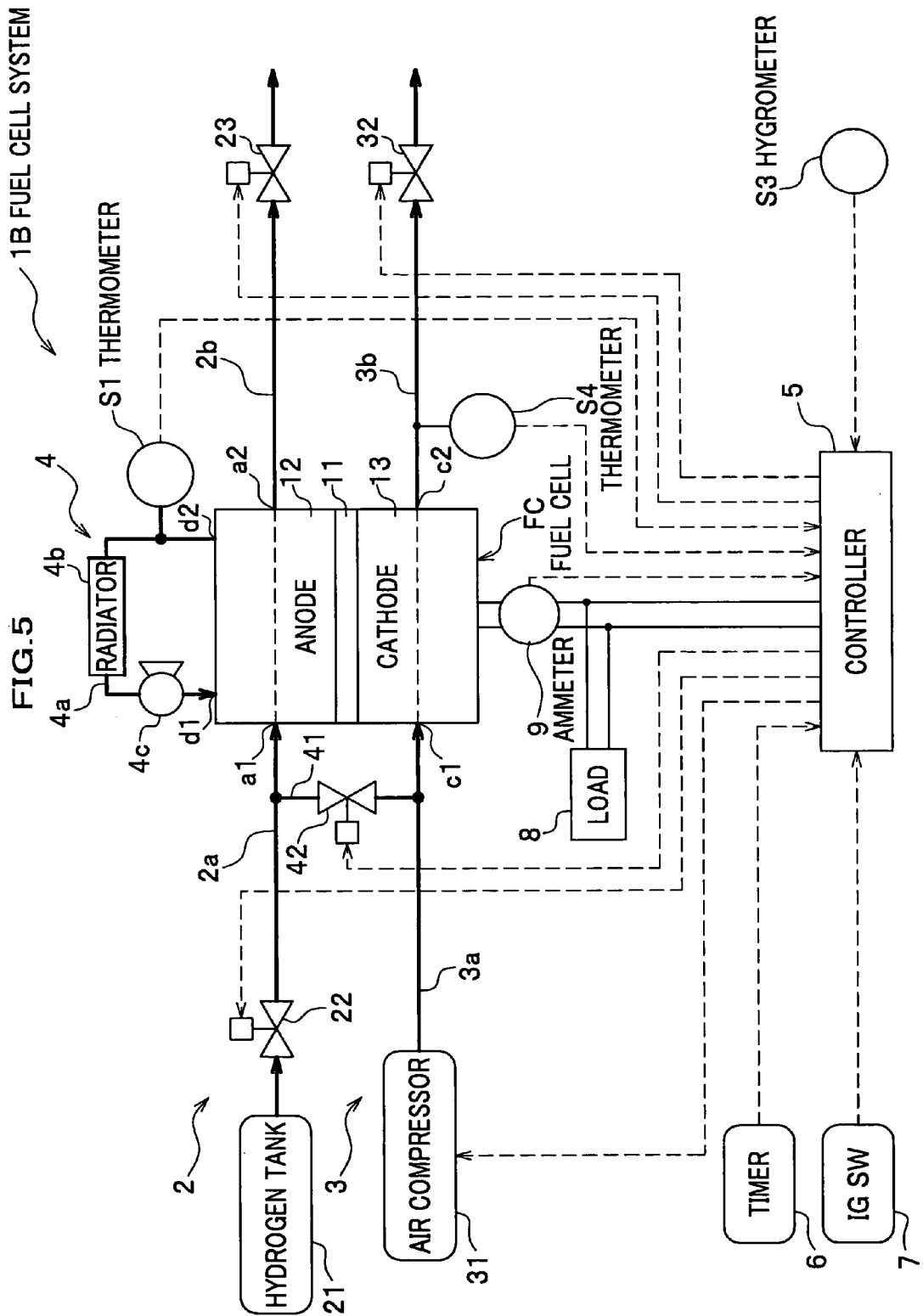
FIG. 5 is a configuration diagram showing a whole fuel cell system according to a second embodiment.
Figure 7A:
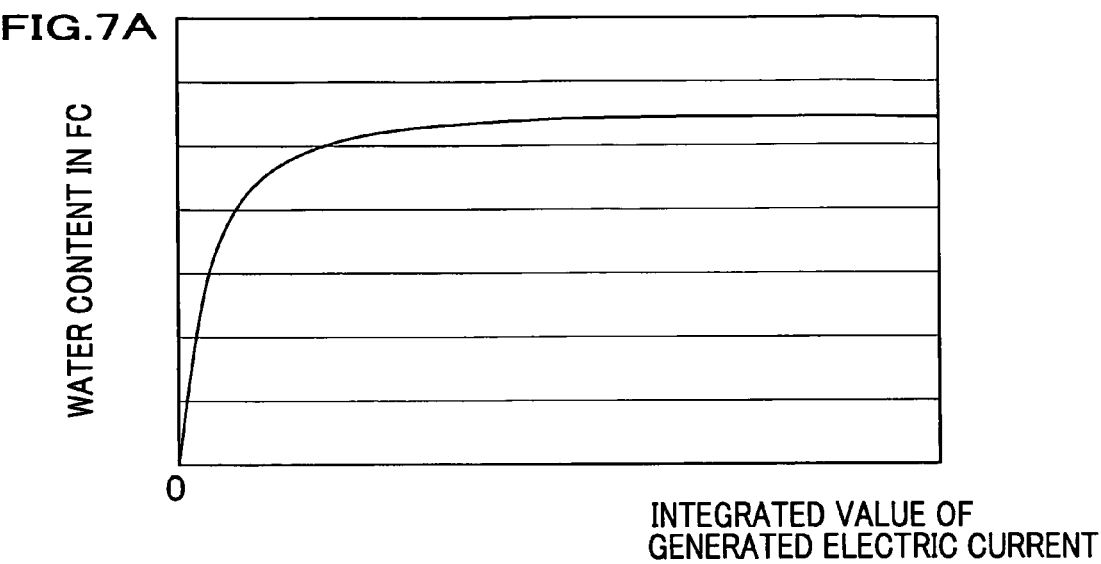
FIG. 7A is a map showing relationship between an integrated value of generated electric current and a water content in a fuel cell.
Figure 7B:
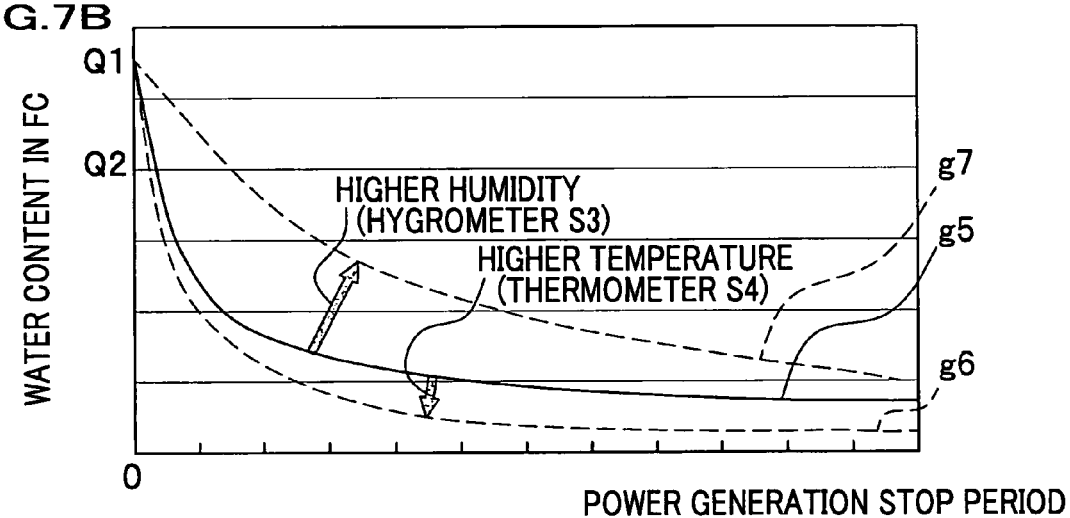
FIG. 7B is a map showing relationship between a power generation stop period and the water content in the fuel cell.
Figure 7C:
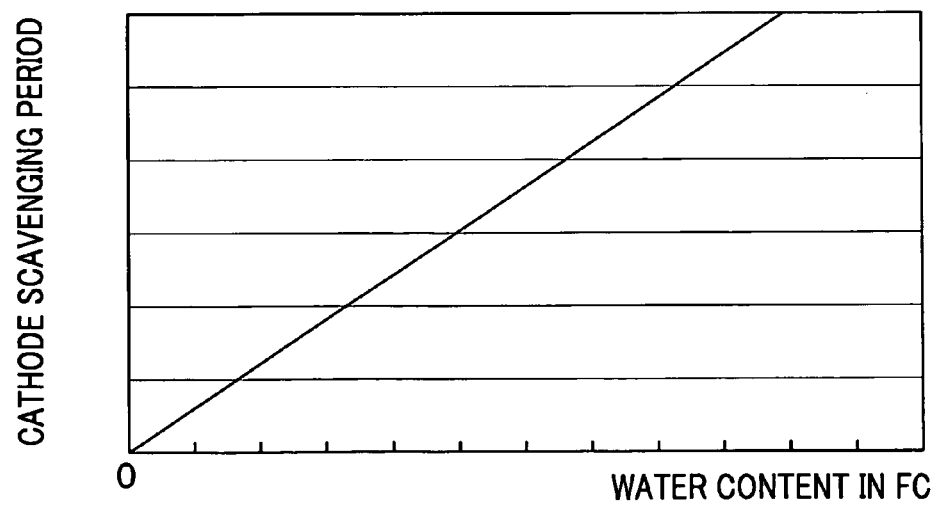
FIG. 7C is a map showing relationship between the water content in the fuel cell and a cathode scavenging period.

FIG. 5 is a configuration diagram showing a whole fuel cell system according to a second embodiment. FIG. 6 is a flow chart showing processes of scavenging in the second embodiment. FIG. 7A is a map showing relationship between an integrated value of generated electric current and a water content in a fuel cell. FIG. 7B is a map showing relationship between a power generation stop period and the water content in the fuel cell. FIG. 7C is a map showing relationship between the water content in the fuel cell and a cathode scavenging period.

In a fuel cell system 1B according to the second embodiment, a thermometer (a temperature detector or a temperature detecting means) S4 is provided in a side of the cathode gas discharge pipe 3b in stead of the thermometer S2 in the fuel cell system 1A (see FIG. 5). Description of the other parts of the configuration, which is similar to the first embodiment, will be omitted. Therefore, only effects of the second embodiment will be explained, below. Since processes in ST21-ST27 in FIG. 6 are similar to the processes in ST1-ST7 in the first embodiment, processes in ST28 and the following steps will be described. Here, a water content in FC in the second embodiment means an amount of water not only in a stack itself of the fuel cell FC but also in pipes around the fuel cell, including the anode gas supply pipe 2a, the anode gas discharge pipe 2b, the cathode gas supply pipe 3a, and the cathode gas discharge pipe 3b. A scavenger (scavenging means) in the present embodiment includes the air compressor 31.

As shown in FIG. 6, in ST28, the water content in FC (the dry degree) is estimated based on a line g5 in FIG. 7B. In a map of FIG. 7B, a solid line g5 shows change in the water content with respect to the power generation stop period. A dashed line g6 shows a compensation line when temperature is higher than the line g5. A dashed line g7 shows a compensation line when humidity is higher than the line g5.

The water content in FC estimated in ST28 is applied to a map of FIG. 7C in order to determine the cathode scavenging period corresponding to the power generation stop period (ST29). The cathode scavenging is performed after the cathode scavenging period has been determined (ST30). More specifically, the controller 5 adjusts an opening degree of the air back pressure valve 32 and drives the air compressor 31 in order to supply air as scavenging gas from the air compressor 31 to the cathode 13 in the fuel cell FC. After the cathode scavenging has been completed (ST31, Yes), automatic monitoring of the temperature is stopped (ST32). Concerning the anode scavenging in the second embodiment, it is possible to open the air intake valve 42 and the hydrogen purge valve 23 in order to perform the anode scavenging immediately after or at the same time when the system is stopped in ST25.

Thus, even in a case of applying the present invention to the scavenging in the cathode side of the fuel cell FC, it is possible to appropriately determine the scavenging period corresponding to the water content in FC so as to prevent unnecessarily too long scavenging. As a result, it is possible to save power consumption, to improve marketable quality, and to prevent the electrolyte membrane 11 from deteriorating.

The present invention is not limited to the above-mentioned embodiments. For instance, a tank filled with inert gas such as nitrogen as scavenging gas may be additionally provided. Thus, the nitrogen in the tank may be used as scavenging gas. Moreover, when the maps of FIG. 3B and 7B are respectively compensated by the temperatures of the thermometers S2 and S4, the thermometers S2 and S4 may not necessarily be located in the positions as illustrated in the embodiments. For instance, even in the case of the anode scavenging (the first embodiment), a thermometer (corresponding to the thermometer S4) provided in the outlet side c2 of the cathode may be used. Meanwhile, even in the case of the cathode scavenging (the second embodiment), a thermometer (corresponding to the thermometer S2) provided in the outlet side a2 of the anode may be used. In addition, a single thermometer may be used for the thermometer S1 which detects the temperature at which the scavenging is started and the thermometers S2 and S4 which detect the temperatures with which the maps are compensated. Furthermore, each of the above-mentioned maps is merely one of examples. Therefore, functions and tables may be used instead of the maps.

According to the present invention, it is possible to scavenge water in a fuel cell with appropriate amount of scavenging gas corresponding to various situations. As a result, it is possible to prevent unnecessary power consumption of a battery and to improve marketable quality.

While the described embodiments represent the preferred forms of the present invention, it is to be distinctly understood that the invention is not limited thereto but may be otherwise variously embodied within the spirit and scope of the following claims.

What is claimed is:

1. A fuel cell system having a fuel cell for generating power by reaction of reactive gases and a scavenging means for introducing scavenging gas to the fuel cell after the fuel cell stops generating the power, the fuel cell system comprising:
   a water amount measuring means for measuring an amount of water in the fuel cell, the water amount measuring means comprising:
      a water amount estimating means for estimating the amount of water in the fuel cell, based on a predetermined relationship map between an integrated value of generated electric current by the fuel cell and an amount of water in the fuel cell,
      a power generation stop period measuring means for measuring a power generation stop period of the fuel cell, and
      an after-stop water amount estimating means for estimating a current amount of water in the fuel cell after the fuel cell stops generating the power, based on a predetermined relationship map between a power generation stop period and an amount of water in the fuel cell; and
   a scavenging period determining means for determining a scavenging period based on a predetermined relationship map between a current amount of water in the fuel cell and scavenging period.

2. The fuel cell system of claim 1, further comprising a system for circulating the reactive gases, wherein
   the water amount estimating means estimates the amount of water based on a relationship that the amount of water increases as an integrated value of generated electric current by the fuel cell increases, and then the amount of water tends to be constant even though the integrated value of generated electric current by the fuel cell increases.

3. The fuel cell system of claim 1, wherein the after-stop water amount estimating means comprises:
   a temperature detecting means for detecting a temperature of the full cell; and
   a water amount compensating means for compensating the amount of water in the fuel cell after the fuel cell stops generating the power, based on the temperature of the fuel cell.

4. The fuel cell system of claim 1, wherein the after-stop water amount estimating means estimates the amount of water in the fuel cell based on a relationship that the water amount increases when the power generation stop period is short, while the water amount decreases when the power generation stop period is long.

5. A fuel cell system control method for controlling a fuel cell system having a fuel cell which generates power by reaction of reactive gases and a scavenger which introduces scavenging gas to the fuel cell after the fuel cell stops generating the power, the fuel cell system control method comprising the steps of:
   measuring an amount of water in the fuel cell by estimating the amount of water in the fuel cell, based on a predetermined relationship map between an integrated value of generated electric current by the fuel cell and an amount of water in the fuel cell, measuring a power generation stop period of the fuel cell, and estimating a current amount of water in the fuel cell after the fuel cell stops generating the power, based on a predetermined relationship map between the power generation stop period and the amount of water in the fuel cell; and
   determining a scavenging period, based on a predetermined relationship map between the scavenging period and the current amount of water in the fuel cell.

6. The method of claim 5, further comprising the steps of:
   circulating the reactive gases; and
   estimating the amount of water, based on a relationship that the amount of water increases as the integrated value of generated electric current by the fuel cell increases, and then the amount of water tends to be constant even though the integrated value of generated electric current by the fuel cell increases.

7. The method of claim 5, further comprising the steps of:
   detecting a temperature of the fuel cell; and
   compensating the amount of water in the fuel cell after the fuel cell stop generating the power, based on the temperature of the fuel cell.

8. The method of claim 5, further comprising the steps of:
   estimating the current amount of water in the fuel cell after the fuel cell stops generating power based on a relationship that the water amount increases when the power generation stop period is short, while the water amount decreases when the power generation stop period is long.

* * * * *